(12) United States Patent
Cornelius et al.

(10) Patent No.: US 10,625,369 B2
(45) Date of Patent: Apr. 21, 2020

(54) WELDING ELECTRODE UNIT

(71) Applicants: ThyssenKrupp System Engineering GmbH, Heilbronn (DE); ThyssenKrupp AG, Essen (DE)

(72) Inventors: Peter Cornelius, Kasel (DE); Jens Husner, Wadern (DE); Stefan Leidinger, Schmelz (DE); Michael Döbert, Reimsbach (DE); David Klecha, Konz (DE)

(73) Assignees: THYSSENKRUPP SYSTEM ENGINEERING GMBH, Heilbronn (DE); THYSSENKRUPP AG, Essen (DE)

( * ) Notice: Subject to any disclaimer, the term of this patent is extended or adjusted under 35 U.S.C. 154(b) by 700 days.

(21) Appl. No.: 15/300,648

(22) PCT Filed: Mar. 24, 2015

(86) PCT No.: PCT/EP2015/056220
§ 371 (c)(1),
(2) Date: Sep. 29, 2016

(87) PCT Pub. No.: WO2015/150160
PCT Pub. Date: Oct. 8, 2015

(65) Prior Publication Data
US 2017/0106465 A1    Apr. 20, 2017

(30) Foreign Application Priority Data

Apr. 2, 2014    (DE) .................. 10 2014 104 641

(51) Int. Cl.
*B23K 11/14*    (2006.01)
*B23K 11/31*    (2006.01)

(52) U.S. Cl.
CPC ............ *B23K 11/14* (2013.01); *B23K 11/317* (2013.01)

(58) Field of Classification Search
CPC ....... B23K 11/14; B23K 11/317; B23K 11/31; B23K 11/318
See application file for complete search history.

(56) References Cited

U.S. PATENT DOCUMENTS 896,218 A  *  8/1908  Lachman ............. B23K 11/087
                                                        219/119
2,045,523 A  *  6/1936  Fassler .................. B23K 11/31
                                                        219/234

(Continued)

FOREIGN PATENT DOCUMENTS

AT        362212 B    4/1981
CN       1241153 A    1/2000

(Continued)

OTHER PUBLICATIONS

Int'l Search Report for PCT/EP2015/056220 dated Jul. 9, 2015 (mailed Jul. 17, 2015).

*Primary Examiner* — Geoffrey S Evans
(74) *Attorney, Agent, or Firm* — thyssenkrupp North America, Inc.

(57) ABSTRACT

A welding electrode unit includes a repositioning device that is movable. The repositioning device includes an energy storage device by way of which a welding electrode is connected directly or indirectly with the energy storage device can have a force applied to it for the purpose of a repositioning movement. The repositioning device is movable into a welding position by way of a forward movement and can be locked in the welding position.

12 Claims, 5 Drawing Sheets

(56) References Cited

U.S. PATENT DOCUMENTS

| | | | | |
|---|---|---|---|---|
| 2,155,412 A | * | 4/1939 | Eckman | B23K 11/31 |
| | | | | 219/86.21 |
| 2,209,932 A | | 7/1940 | Eberhard | |
| 3,553,420 A | * | 1/1971 | Shearer, Jr. | B23K 11/253 |
| | | | | 219/110 |
| 4,425,073 A | | 1/1984 | Mattsson | |
| 9,211,606 B2 | * | 12/2015 | Tiberghien | B23K 11/115 |
| 2003/0222055 A1 | * | 12/2003 | Marek | B23K 11/3018 |
| | | | | 219/86.25 |
| 2005/0150873 A1 | * | 7/2005 | Schmitt-Walter | B23K 11/115 |
| | | | | 219/86.32 |
| 2007/0007252 A1 | * | 1/2007 | Ritter | B23K 11/008 |
| | | | | 219/56 |

FOREIGN PATENT DOCUMENTS

| | | | |
|---|---|---|---|
| CN | 201316863 Y | 9/2009 | |
| CN | 102834214 A | 12/2012 | |
| CN | 103228389 A | 7/2013 | |
| DE | 2618043 A | 11/1976 | |
| DE | 102010005357 A | 7/2011 | |
| DE | 102010005357 A1 | 7/2011 | |
| DE | 102011113403 B | 10/2012 | |
| EP | 2218549 A | 8/2010 | |
| WO | WO-0136142 A1 * | 5/2001 | B23K 11/315 |
| WO | 2012045746 A1 | 4/2012 | |

\* cited by examiner

WELDING ELECTRODE UNIT

CROSS REFERENCE TO RELATED APPLICATIONS

This application is a U.S. National Stage Entry of International Patent Application Serial Number PCT/EP2015/056220, filed Mar. 24, 2015, which claims priority to German Patent Application No. DE 10 2014 104 641.2 filed Apr. 2, 2014, the entire contents of both of which are incorporated herein by reference.

FIELD

The present disclosure relates to welding electrode units and methods for welding, including projection welding.

BACKGROUND

Such welding electrode units are known, for example, from industrial production systems, in which work pieces are welded at high cycle speeds. In this regard, the welding electrodes perform forward movements, in order to enter into contact with a work piece to be welded. In this regard, it is absolutely necessary that the welding electrode unit contacts the work piece with a welding electrode, in order to maintain the electrical current required for the welding process. If contact is interrupted, the flow of current through the welding electrode stops, whereupon the welding process stops. Such a break in contact between welding electrode and work piece often takes place necessarily if the welding process melts part of the work piece, at least for a certain period of time. The interrupted welding process then has a disadvantageous effect on the strength and the visual point quality (surface quality) of the weld.

In order to guarantee a continuous welding process, apparatuses are known in the state of the art, such as, for example, the ones from the document DE 10 2010 005 357 A1, which ensure a repositioning movement and prevent interruption of contact. The success of the apparatus from the document DE 10 2010 005 357 A1 is due, among other things, to the fact that the pressure of the welding electrode on the work piece can be kept essentially constant. For this purpose, it is necessary that a repositioning device is held in position, in the welding position, by way of an energy source. In this regard, the movement of the welding electrode is determined by coupling the repositioning movement with the forward movement.

DETAILED DESCRIPTION

Figure 1:
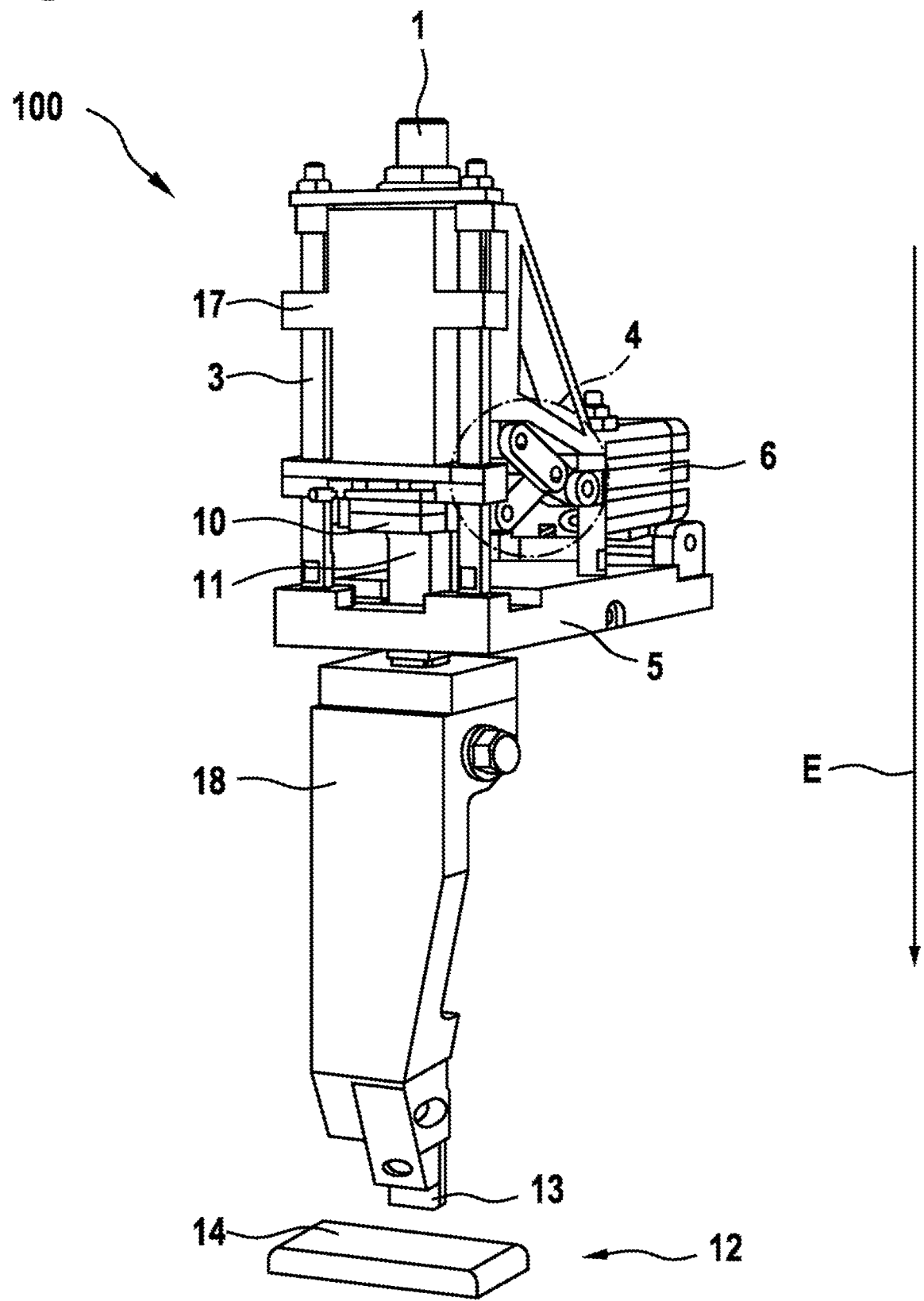
FIG. 1 is a perspective view of an example electrode welding unit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

One example object of the present disclosure is to further improve the welding electrode unit known from the state of the art. In particular, keeping the pressure of the welding electrode on the work piece constant during the welding processes further optimized. In this regard, the intent is to increase the strength in the weld, using the welding electrode unit, just as much as its visual point quality (surface quality). Furthermore, it would be desirable to make a compact welding electrode unit available, which can be integrated into a production system in the simplest possible manner.

This object is accomplished by means of a welding electrode unit, wherein the welding electrode unit comprises a movable repositioning device, wherein the repositioning device has a stored-energy means, by way of which a welding electrode that is connected, directly or indirectly, with the stored-energy means can have a force applied to it for its repositioning movement, wherein the repositioning device can be moved into a welding position by means of a forward movement and locked in the welding position.

As compared with the state of the art, the welding electrode unit according to the invention has the advantage that the repositioning device can be locked in the welding position. By means of this locking, the repositioning movement is determined exclusively by the stored-energy means and is essentially independent of other potential parameters that could also influence the repositioning movement. This advantageously makes it possible to keep the pressure set during the welding process constant.

In this regard, it is provided that the welding electrode enters into contact with a work piece to be welded in the welding position. In this regard, projection welding is conceivable as the preferred welding method. Preferably, the forward movement takes place linearly. Furthermore, it is conceivable that the welding electrode unit is an integral part of a production system, in which work pieces are shaped, preferably folded, for example, before being welded. For example, the work piece is a piece of sheet metal, which is supposed to be made available and subsequently first shaped within the scope of the production process, and subsequently welded to form an engine compartment hood, for example. In this regard, the repositioning movement ensures that the contact between welding electrode and work piece to be welded, which contact could otherwise possibly be interrupted due to melting in the weld, is maintained. Preferred embodiments and further developments of the invention can be derived from the dependent claims as well as from the description, making reference to the drawings.

In a further embodiment, it is provided that the forward movement is uncoupled from the repositioning movement. Preferably, in this regard, forward movement and repositioning movement take place in the same direction, directed at a work piece. By means of the uncoupling, impairment of the repositioning movement by the forward movement is advantageously excluded; this impairment would otherwise be difficult to avoid, since forward movement and repositioning movement are preferably directed in the same direction. As a consequence, the force that is applied to the welding electrode is established by the stored-energy means.

In a further embodiment, it is provided that the repositioning device can be moved into the welding position and/or can be locked in the welding position by means of a toggle lever mechanism. Using the toggle lever mechanism, not only can the forward movement be controlled in simple manner, but also the repositioning device can be locked in the welding position in such a manner that the repositioning movement is uncoupled from the forward movement. In this regard, it is provided that a drive movement that runs essentially perpendicular to the forward movement can be translated into the forward movement of the repositioning device by means of the toggle lever mechanism. This makes it possible to advantageously implement a welding electrode unit that can be integrated into a production system in space-saving manner. In particular, the lifting path can be increased without reducing the forward force, by means of the toggle lever mechanism.

In a further embodiment, it is provided that the welding electrode unit is structured in such a manner that the forward movement takes place with time offset from the repositioning movement. In particular, the forward movement is terminated as soon as the welding position is reached. Only then do the welding process and the repositioning movement required to maintain the welding process start. Preferably, the toggle lever mechanism is fully extended and locks the repositioning device in place, the stored-energy means of which is then solely responsible for the repositioning movement.

In a further embodiment, it is provided that a forward direction, along which the forward movement takes place, can be established by means of a column guide. In this regard, it is provided that the repositioning device is connected with the column guide in such a manner that the repositioning device uses the column guide as a type of rail system. In this regard, it is conceivable that the repositioning device encloses the column guide, at least in part, and can be moved relative to it. The forward movement is controlled by means of the column guide, and transfer of the drive movement to the forward movement is advantageously supported.

In a further embodiment, it is provided that the toggle lever mechanism is connected with an energy source, wherein the forward movement can be controlled by means of an energy flow from the energy source to the repositioning device, by way of the toggle lever mechanism. Preferably, the energy source brings about the drive movement, and the toggle lever mechanism transfers the energy proceeding from the energy source to the repositioning device, for the forward movement, in as loss-free a manner as possible. By means of the toggle lever mechanism, the energy can be advantageously transferred to the repositioning device, if possible directly, or indirectly.

In a further embodiment, it is provided that the energy source comprises a compressor, a pump and/or a pneumatic cylinder. In particular, the energy source is adapted to the desired or required forward movement. Preferably, the energy source can be controlled directly and/or is adapted to the cycling in a production system. In particular, a spatially small pneumatic cylinder can be implemented by means of the toggle lever mechanism, while simultaneously increasing the lifting path, without any reduction in the forward force. In this way, a compact welding electrode unit can be implemented, which unit can be integrated into a production system in the simplest possible manner.

In a further embodiment, it is provided that the stored-energy means comprises a pressure spring, an elastomer cylinder, a hydraulic cylinder and/or a further pneumatic cylinder. In particular, the stored-energy means is jacketed by the repositioning device, at least in part, and carried along by the repositioning device during the forward movement. In advantageous manner, the force that is applied to the welding electrode can be adapted to the welding process or to the work piece to be welded, as optimally as possible, by means of the selection of a spring constant of the pressure spring.

In a further embodiment, it is provided that the repositioning device comprises an adjustment screw and/or a sensor means for energy measurement. By means of the adjustment screw, a bias force for the repositioning movement can be advantageously established. By means of the sensor means for energy measurement, it can be checked directly whether the pressure is constant or whether a correction of the bias force is required. In this way, it is possible to ensure that the pressure of the welding electrode on the work piece remains as constant as possible during the welding process, even if keeping it constant is made more difficult due to melting of the work piece.

In a further embodiment, it is provided that the repositioning device is jacketed, at least in part, by a housing and/or disposed on a base plate. In particular, the housing comprises a lid region, on a side facing away from the base plate, in which region the stored-energy means is disposed. The housing not only holds the stored-energy means, but rather advantageously protects against harmful environmental influences, which could permanently restrict the functionality of the stored-energy means.

In a further embodiment, it is provided that the welding electrode is connected with the stored-energy means by way of a tappet, and the base plate has a recess through which the tappet can be passed. In particular, the tappet is disposed on the stored-energy means in such a manner that the tappet and/or the stored-energy means project(s), at least in part, out of the housing. Furthermore, it is provided that the tappet can be guided through the recess with precise fit, and in this way, the forward movement along the forward direction is further supported, in advantageous manner.

In a further embodiment, it is provided that an adapter is disposed between welding electrodes and tappet, wherein the adapter can be adapted to a work piece to be welded. In this regard, it is conceivable that different adapters differ in their length, for example. The suitable adapter for the respective production process can then be selected as a function of the thickness of the work piece. In this way, the welding electrode unit can be used for a plurality of different work pieces. This is particularly advantageous for production systems in which different components are shaped and/or welded.

Furthermore the object of the invention is accomplished by a method for welding, preferably for projection welding, wherein a welding electrode is moved into a welding position by means of a forward movement, wherein a repositioning device connected with the welding electrode is locked in the welding position, and a force is applied to the welding electrode, directly or indirectly, for a repositioning movement.

By means of the locking, the repositioning movement is independent, to a great extent, of other influences, and can advantageously be determined solely by means of the selection of the means of energy flow, for example in the case of a pressure spring, by means of its spring constant. In particular, it is possible, by means of the locking, to refrain from holding the repositioning device in its position after it has assumed the welding position, by means of further expenditure of energy.

In a further embodiment, it is provided that the forward movement is uncoupled from the repositioning device, preferably using a toggle lever mechanism. By means of the uncoupling, the repositioning movement becomes solely dependent on the stored-energy means, and can therefore be adjusted in simpler and more precise manner.

In a further embodiment, it is provided that for welding, preferably for projection welding, a welding electrode unit according to the present disclosure may be used. In this way, as fixed as possible a welding position can advantageously be implemented, which position furthermore meets increased demands with regard to visual point quality.

With reference now to the figures, further details, characteristics, and advantages of the present disclosure are evident from the figures as well as from the following description of examples shown in the figures. As those having ordinary skill in the art will understand, the figures merely illustrate examples of the present disclosure, which do not in any way restrict the scope of the present disclosure.

In various figures, the same parts are typically provided with the same reference symbols, and will therefore be identified or mentioned only once in most cases.

In FIG. 1, in a perspective view, a welding electrode unit 100 according to an exemplary embodiment of the present invention is shown. Such a welding electrode unit 100 is an integral part, for example, of a production system in which a component for a vehicle, such as an engine compartment hood, for example, is shaped and joined. In this regard, it is conceivable that one or more work pieces 12 are first folded and subsequently welded during a welding process, at a weld 14, in the production system. Preferably, the welding process is a projection welding process. In the production system, the welding electrode unit 100 is responsible for welding. In this regard, the welding electrode unit 100 comprises a welding electrode 13, which is disposed on a tappet 11 by way of an adapter 18. In a basic position of the welding electrode unit 100 illustrated in the figure, the tappet 11 is moved in relative to a base plate 5, thereby disposing the welding electrode 13 at a distance from the work pieces to be welded or the work piece 12 to be welded. In order to get from the basic position to a welding position, in which the welding electrode contacts at least one of the work pieces 12 to be welded, it is provided that the tappet 11 performs a forward movement along a forward direction E.

Preferably the base plate 5 of the welding electrode unit 100 comprises a recess through which the tappet 11 passes or crosses during its forward movement. In this regard, the recess is preferably adapted to the tappet 11 with precise fit. In this way, guidance of the tappet 11 during its forward movement can be supported. In this regard, it is conceivable that the tappet 11 already projects out of the base plate 5, at least in part, in its basic position. By means of the forward movement, the extent of projection is supposed to be increased to such an extent that at the end of its forward movement, the welding electrode 13 enters into contact with the work piece 12 to be welded.

Furthermore, it is provided that the tappet 11 is connected with a repositioning device 2 by way of a pressure spring 8. Preferably, the pressure spring 8 is connected with the repositioning device 2 by way of an upper spring bolt 7, and with the tappet 11 by way of a lower spring bolt 9. In this regard, the repositioning device 2 comprises a housing 17, wherein the housing 17 has a lid region on its side facing away from the base plate 5, on the inside of which region the upper spring bolt 7 or the pressure spring 8 is attached. Preferably, the housing 17 encloses the pressure spring 8 in sleeve-like manner, wherein the housing 17 has an opening at a lower end, facing the base plate 5, from which opening the tappet 11 and/or the pressure spring 8 projects out of the housing 17.

It is furthermore provided that the repositioning device 2 can be driven to perform a forward movement, by way of a toggle lever mechanism 4. In this regard, the repositioning device 2 itself is coupled with a column guide 3, in such a manner that the column guide 3 determines the forward direction during the forward movement. Preferably, for this purpose, at least a part of the repositioning device 2, particularly a part of the housing 17, encompasses or encloses the column guide 3. The column guide 3 is preferably also attached to the base plate.

Figure 2A:
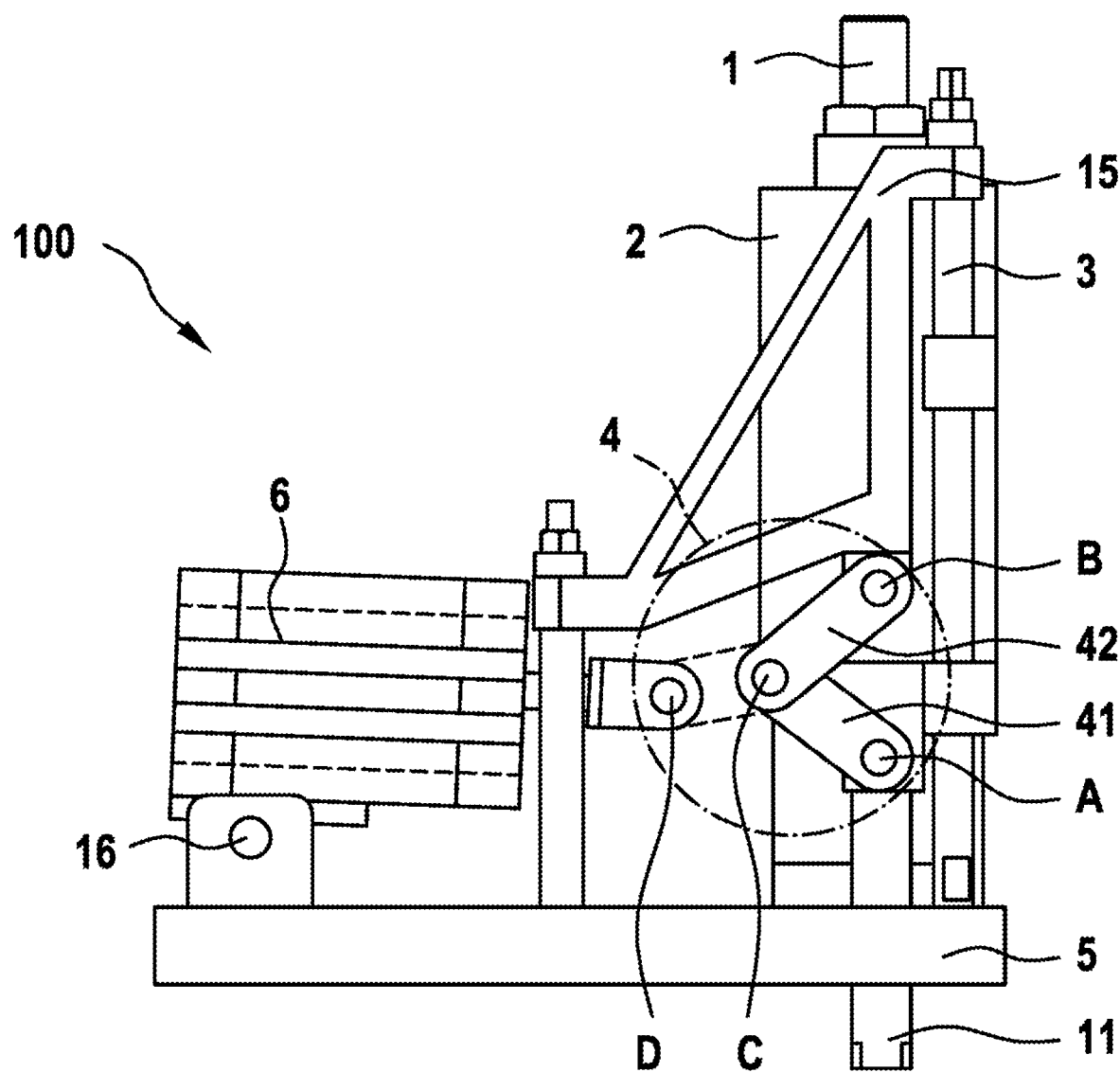
FIG. 2a is a first side view of the example electrode welding unit of FIG. 1 in a basic position.
Figure 2B:
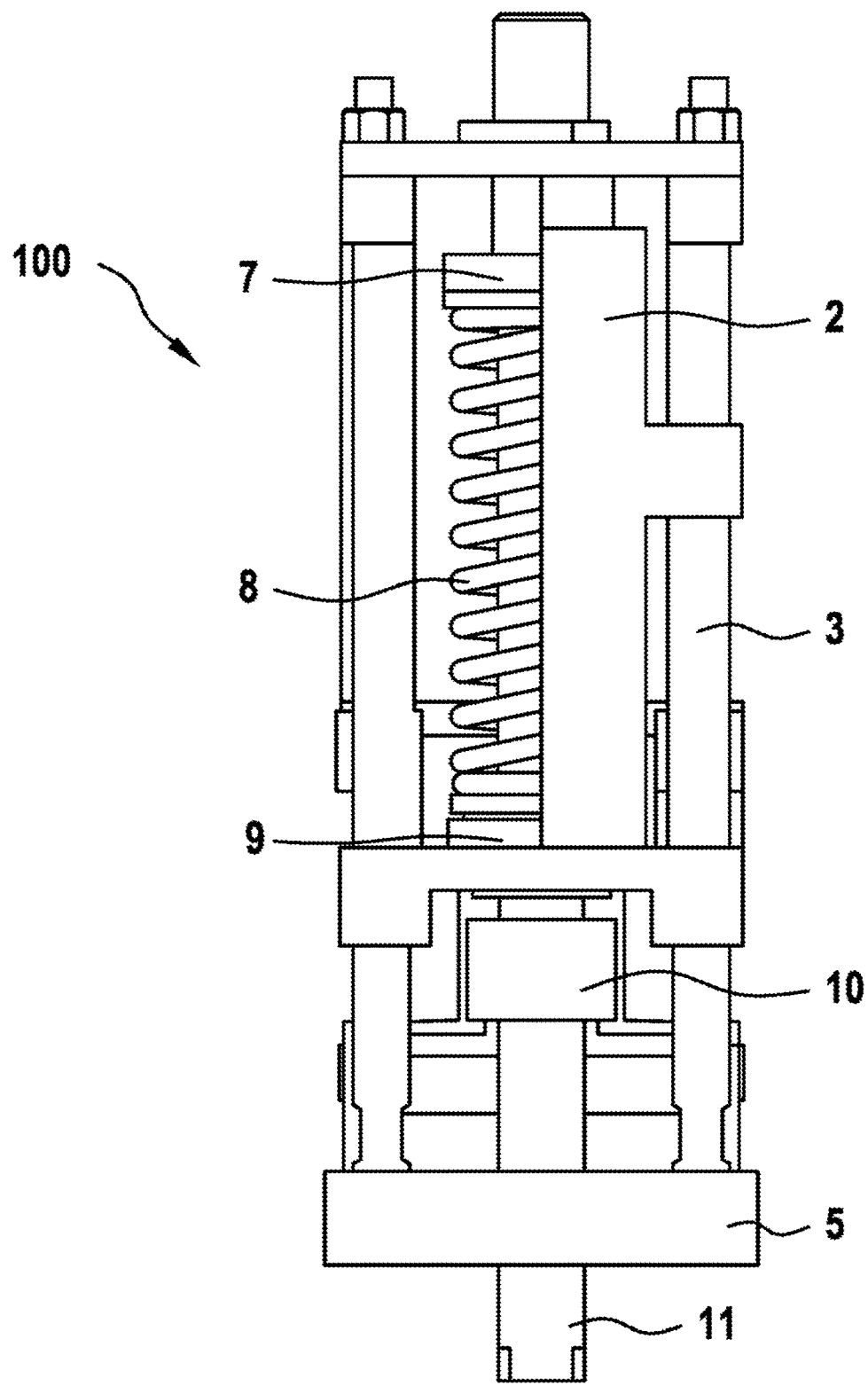
FIG. 2b is a second side view of the example electrode welding unit of FIG. 1 in a basic position.

In FIGS. 2a and 2b, the welding electrode unit 100 of the first exemplary embodiment of the present invention is shown in two different side views, in a basic position. In this regard, in FIG. 2b, part of the housing 17 is not shown, in order to allow a view of the pressure spring 8. For the forward movement of the repositioning device 2 and thereby for the tappet 11, out of the basic position, it is provided that the toggle lever mechanism 4 translates a drive movement that runs essentially perpendicular to the forward direction or essentially perpendicular to the forward movement into the forward movement. In this way, the forward movement is controlled by way of the toggle lever mechanism 4.

The toggle lever mechanism 4 is preferably composed, in detail, of
- a first rocker 41 that can be pivoted about a first articulation axis A, and
- a second rocker 42 that can be pivoted about a second articulation axis B, wherein first and second rocker 41 and 42 are connected with one another in such a manner that the first rocker 41 can be pivoted, relative to the second rocker 42, about a third articulation axis C. In particular, the first and the second articulation axis A and B are disposed along a direction that runs parallel to the forward direction, wherein
- the first rocker 41 is articulated so as to pivot about the first articulation axis A, on the repositioning device 2 that can be moved along the forward direction, and
- the second rocker 42 is articulated on a locally fixed frame structure 15, about the second articulation axis B. In this way, it is possible that a distance between the first articulation axis A and the second articulation axis B can be varied, by means of a drive movement that runs essentially perpendicular to the forward direction, which movement is performed by the third articulation axis C, and thereby finally, the repositioning device 2 can be moved along the forward direction E. In the embodiment shown in FIG. 1, it is provided that the drive movement is introduced by means of a pneumatic cylinder 6. For a movement of the repositioning device 2 in the direction of the base plate 5, a piston of the pneumatic cylinder 6 is moved out, the first rocker 41 is pivoted clockwise, and the distance between the first articulation axis A and the second articulation axis B is increased. In this regard, the piston is preferably articulated on the first rocker 41 so as to pivot about a third articulation axis C. During the drive movement of the piston, the third articulation axis C moves, at least in part, on a circular path. In order to be able to bring about the pivoting movement of the first rocker A, it is therefore necessary that the piston follows this circular path during its drive movement, at least in part. For this purpose, the pneumatic cylinder 6 is preferably articulated on the base plate so as to pivot about a fourth articulation axis D, thereby causing the piston to adapt its inclination relative to the base plate 5 during its drive movement.

Figure 3A:
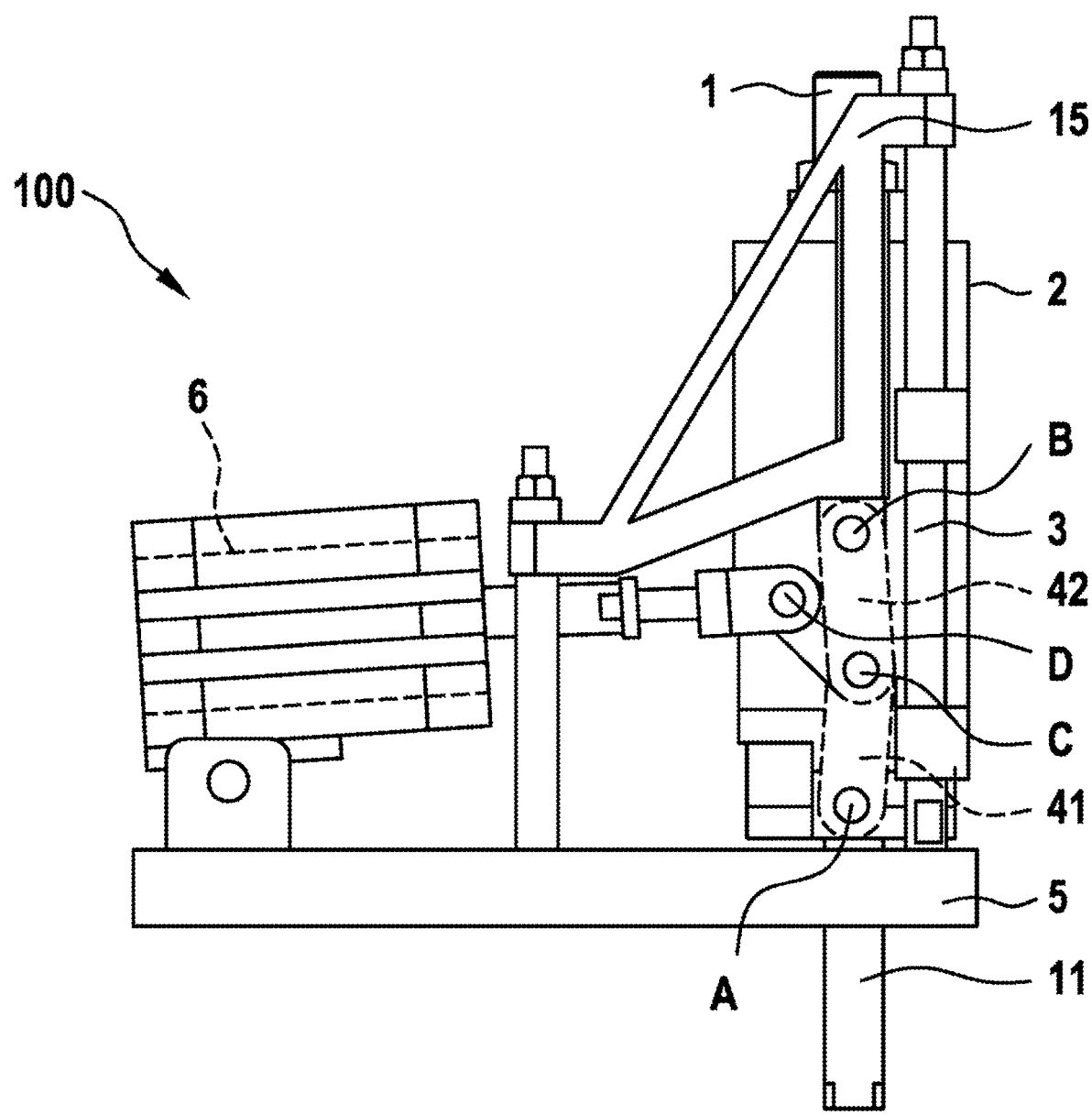
FIG. 3a is a first side view of an example welding electrode unit in a welding position.
Figure 3B:
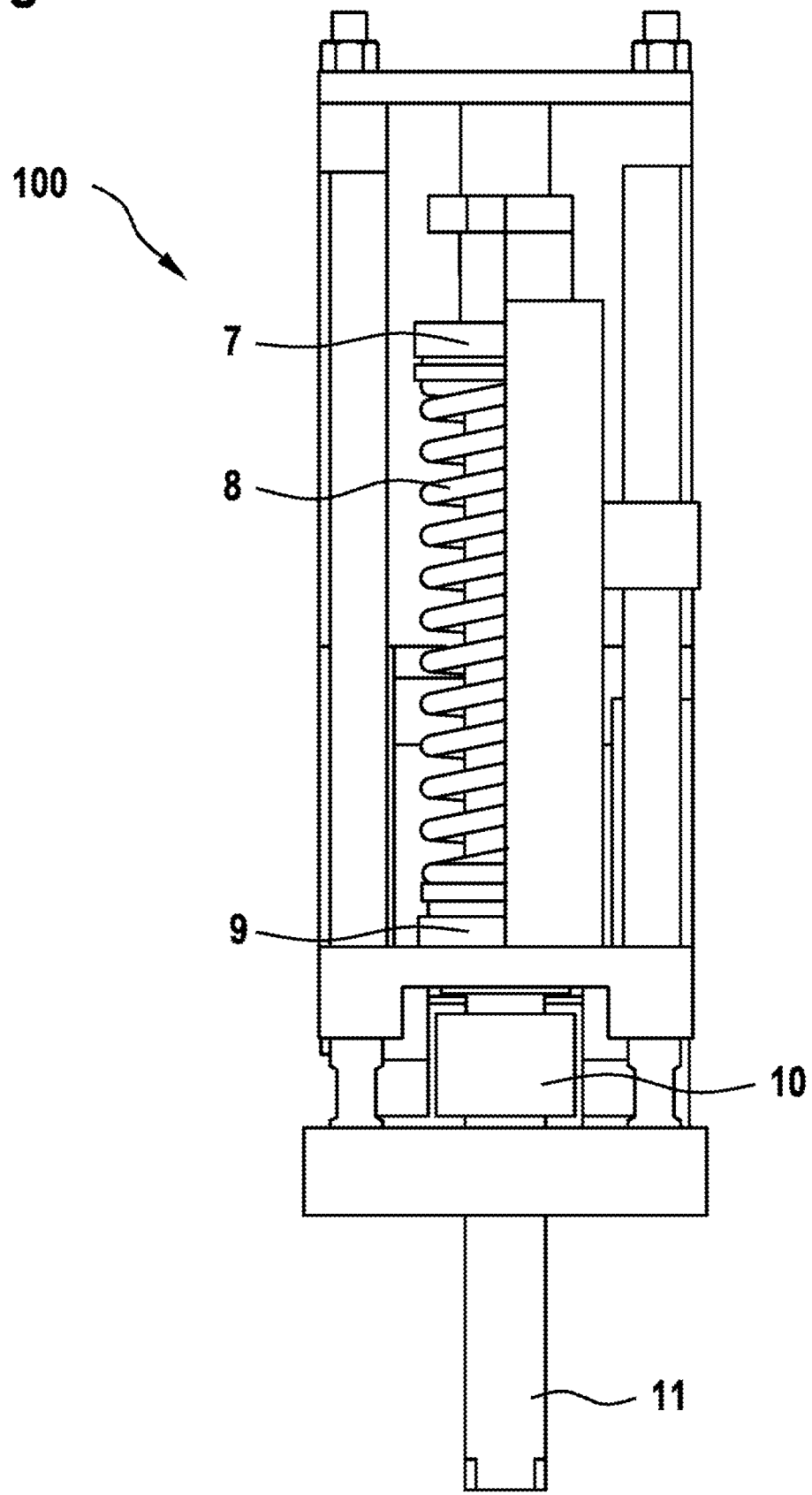
FIG. 3b is a second side view of an example welding electrode unit in a welding position.

In FIGS. 3a and 3b, the welding electrode unit 100 according to the first exemplary embodiment of the invention is shown in two different side views, in the welding position. In the welding position, the forward movement has been terminated. The forward movement of repositioning device and thereby of the tappet 11 is preferably terminated as soon as the toggle joint mechanism 4 has been fully extended, i.e. the first, the second, and the third articulation axis A, B, and C are disposed along the direction that runs parallel to the forward direction E. In particular, the repositioning device 2 is locked in the welding position, preferably while the toggle lever mechanism 4 is fully extended, by means of the toggle lever mechanism 4.

As soon as the welding position has been reached, the forward movement controlled by the toggle lever mechanism 4 is terminated. A subsequent repositioning movement is particularly independent of the forward movement. A stored-energy means, which is formed by the pressure spring 8 in the first exemplary embodiment, ensures the repositioning movement required during the welding process. In this regard, it is provided that over the duration of the welding process, the welding electrode 13 acts on a weld 14 with an essentially constant force or with an essentially constant pressure. In this way, melting of the work piece 12 in the region of the weld 14, which occurs during a welding process for system reasons, is balanced out (in terms of path) by way of the repositioning movement brought about by the pressure spring 8. In this regard, the force that acts on the tappet 11 by means of the pressure spring 8 can be optionally adjusted using an adjustment screw 1, wherein a bias force can be adjusted or established by means of the adjustment screw 1, with which force the welding electrode 13 presses on the work piece 12.

In particular, the welding electrode unit 100 has a sensor means 10 for measuring energy, which means is preferably disposed between the lower spring bolt 9 and the tappet 11. In this way, the force effect of the welding electrode 13 on the work piece 12 can be advantageously controlled and, if necessary, corrected or optimized by means of the adjustment screw 1.

What is claimed is:

1. A welding electrode unit comprising:
   a repositioning device that is movable and includes a stored-energy means; and
   a welding electrode connected directly or indirectly to the stored-energy means such that the stored-energy means can apply a force to the welding electrode for purposes of a repositioning movement, wherein the repositioning device can be moved into a welding position by way of a forward movement and can be locked in the welding position, wherein the forward movement is movement of at least a portion of the welding electrode unit in a direction toward the workpiece; and
   further comprising a toggle lever mechanism for locking the repositioning device in the welding position.

2. The welding electrode of claim 1 wherein the toggle lever mechanism is connected with an energy source, wherein the forward movement is controllable by an energy flow from the energy source to the repositioning device by way of the toggle lever mechanism.

3. The welding electrode of claim 2 wherein the energy source comprises at least one of a compressor, a pump, or a pneumatic cylinder.

4. The welding electrode unit of claim 1 wherein a time at which the forward movement occurs is offset from a time at which the repositioning movement occurs.

5. The welding electrode unit of claim 1 wherein the direction is established by a column guide.

6. The welding electrode unit of claim 1 wherein the stored-energy means comprises at least one of a pressure spring, an elastomer cylinder, a hydraulic cylinder, or a pneumatic cylinder.

7. The welding electrode unit of claim 1 wherein the repositioning device comprises at least one of an adjustment screw or a sensor means for energy measurement.

8. The welding electrode unit of claim 1 wherein the repositioning device is at least one of
   jacketed at least in part by a housing or
   disposed on a base plate.

9. The welding electrode unit of claim 1 wherein the welding electrode is connected to the stored-energy means by way of a tappet and the repositioning device is disposed on a base plate, wherein the base plate has a recess through which the tappet can be passed.

10. The welding electrode unit of claim 1 further comprising an adapter disposed between the welding electrode and a tappet, wherein the adapter is adaptable to a work piece to be welded.

11. A method for welding comprising:
    moving a welding electrode into a welding position by a forward movement, the forward movement being a direction toward a workpiece;
    locking a repositioning device connected to the welding electrode into the welding position;
    applying directly or indirectly a force to the welding electrode for a repositioning movement, and
    uncoupling said moving step from said applying step via a toggle lever mechanism.

12. The method of claim 11 wherein the welding electrode is part of a welding electrode unit that comprises a repositioning device that is movable and has a stored-energy means, wherein the welding electrode is connected directly or indirectly to the stored-energy means such that the stored-energy means can apply a force to the welding electrode for purposes of the repositioning movement, wherein the repositioning device is positioned for welding by way of the forward movement.

\* \* \* \* \*